United States Patent

Reese

[11] 3,887,347
[45] June 3, 1975

[54] METHOD OF PACKAGING GLASS STRAND

[75] Inventor: Walter J. Reese, North Huntington, Pa.

[73] Assignee: PPG Industries, Inc., Pittsburgh, Pa.

[22] Filed: Apr. 1, 1974

[21] Appl. No.: 457,014

[52] U.S. Cl. .......................... 65/3; 28/21; 28/75 R; 65/2; 117/126 GE; 242/18 G
[51] Int. Cl. ...................... C03c 25/02; C03b 37/02
[58] Field of Search ................. 65/2, 3, 11 W, 11 R; 28/21, 75 R

[56] References Cited
UNITED STATES PATENTS

| | | | |
|---|---|---|---|
| 2,736,676 | 2/1956 | Frickert | 65/3 X |
| 2,880,552 | 4/1959 | Whitehurst | 65/3 |
| 3,281,223 | 10/1966 | Simison | 65/3 |
| 3,285,721 | 11/1966 | Ewing | 65/11 W X |
| 3,718,449 | 2/1973 | Fahey | 65/3 |

Primary Examiner—Robert L. Lindsay, Jr.
Attorney, Agent, or Firm—John E. Curley

[57] ABSTRACT

A method is provided for packaging fiber glass strand in large shippable containers directly from forming which involves attenuating the strands at high speed, applying a binder to the strand, drying the strand to remove the moisture from the strand picked up in the binder application step, rewetting the strand and collecting it in a container which is subsequently dried. Good strand runout is readily achieved.

6 Claims, 1 Drawing Figure

PATENTED JUN 3 1975 3,887,347
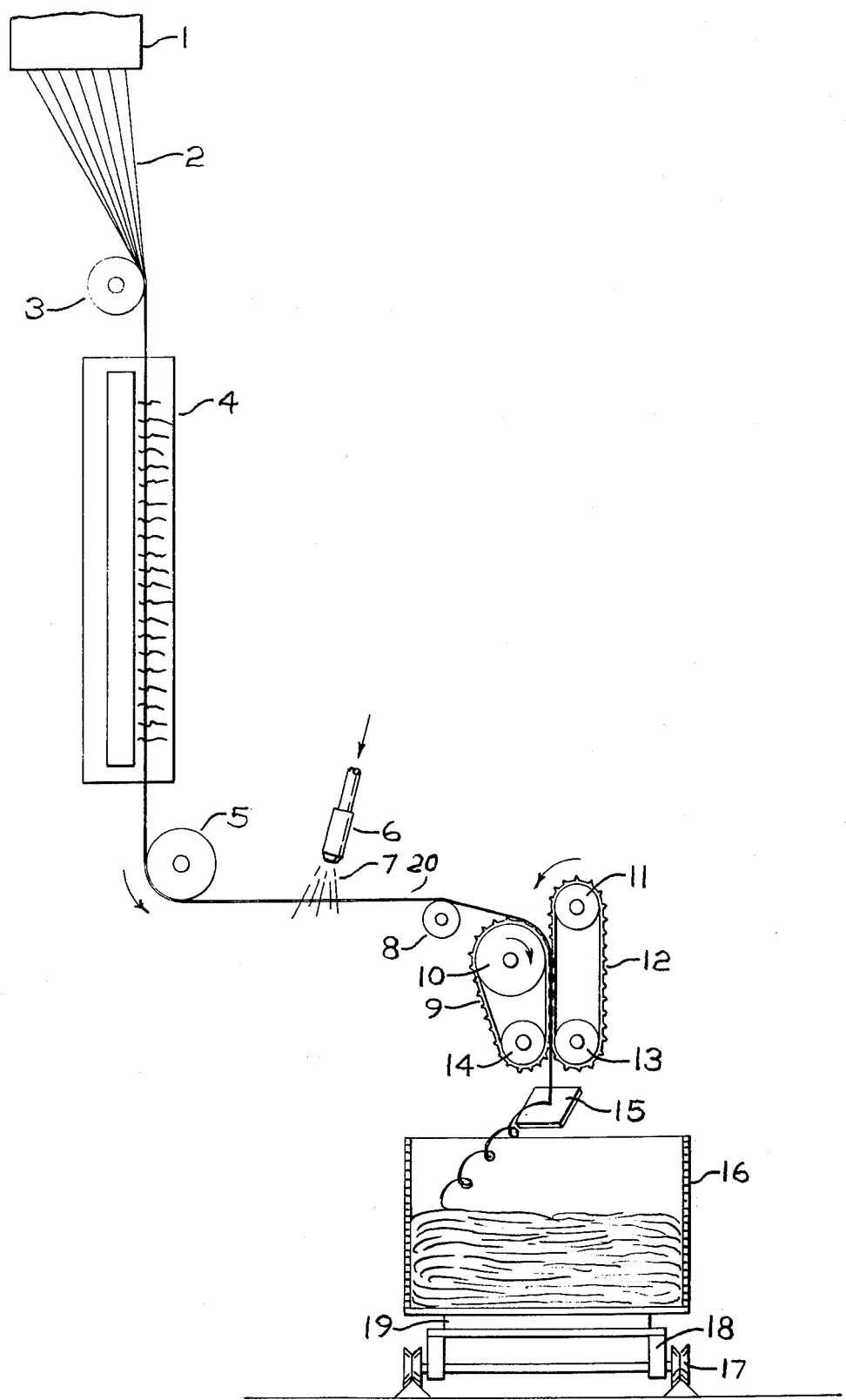

METHOD OF PACKAGING GLASS STRAND

BACKGROUND OF THE INVENTION

In the manufacture of continuous glass fibers, molten glass is fed from a molten glass melting source such as a glass melting furnace into a fiber glass bushing which is typically electrically heated to maintain control of the temperature of the glass melt. The bottom of the bushing is provided with a plurality of orifices or bushing tips carefully controlled in size to provide for the passage of molten glass therethrough in fine filamentary streams. The molten glass is drawn from the bushing tips by attaching the filaments to a high speed winding source and the winder provides the pulling force to the fibers. In a typical fiber glass operation a multiplicity of filaments from a glass fiber bushing are gathered into a strand and the strand is wrapped around a forming package contained on the winder at high speed.

As will be readily appreciated, the limitations placed on this type of operation are intimately associated with the winding source itself since these are high speed rotating machines which collect on the surface thereof, a forming package of varying size. Glass fiber strand packages wound in this manner achieve considerable size in terms of weight and it is a desirable goal in winding glass strand to wind packages as large as possible so that minimized interruption of the glass forming process occurs during the processing. Thus, the tendency in modern commercial operations today is to wind packages which can contain as much as 150 pounds of glass on the surface of the package. While strand forming packages of this size are feasible, it does present some problems in handling during manufactuirng because of the extreme weight of these materials and the fact that they have to be removed from the surface of a winder in order to be replaced by an empty package after the winding process has been completed.

THE PRESENT INVENTION

In accordance with the present invention, a method is provided for attenuating glass strand at high speeds and providing for the production of large containerized packages from which the strand can be easily removed. Thus, in accordance with the instant invention, a plurality of glass fiber filaments are drawn from a fiber glass bushing, passed over a binder applicator, and a suitable binder is applied to the glass fibers to provide them for the particular use, i.e., plastic reinforcement, rubber reinforcement and the like. The glass fibers are then passed through a heating oven to drive off the moisture accumulated on the fiber filaments as they pass over the binder applicator. The water content of the fibers is typically 1 percent by weight or less. The dried fibers are gathered into a strand and removed from the moisture removal zone. The strand is then passed under a fine water spray and water is applied thereto in amounts sufficient to provide on the surface of the strand between 2 and 6 percent by weight of water, preferably 3 to 5 percent. The wetted strand is then passed from the water treatment zone through the attenuator, deflected off a momentum reducing surface to substantially reduce the inertial forces imparted to the strands as they are projected from the attenuator. The strand is then collected preferably in a rotating drumlike structure or container provided with porous sidewalls. The strands gathered in the container are then subjected to a drying step to remove a substantial portion of the moisture applied to strand during the moisture treatment step prior to shipping.

For a more complete understanding of the instant invention, reference is made to the accompanying drawing which is a diagrammatic illustration of one embodiment of the instant process showing the utilization of the instant invention to package in a container glass fiber strand being produced in a forming operation.

As shown in the drawing a fiber glass bushing is depicted generally at 1. Emanating from the underside of the fiber glass bushing 1 are a plurality of glass filaments 2 which are drawn over the surface of a binder applicator generally indicated at 3. The fibers are then passed through a drying oven generally indicated at 4 and around a gathering shoe 5 as they emerge from the oven which combines the fibers into a strand 20. The strand 20 is then sprayed with a water spray 7, emitted by nozzle 6 and passed over a roll 8 between the belt surfaces 9 and 12 of a geared tooth belt attenuator. The geared belt attenuator consists of belts 9 and 12 which ride over rotating wheels or pulleys 10 and 14 and 11 and 13, respectively. The finished fiber glass strand 20 is driven from the belt surfaces onto the surface of a deflector screen 15 which serves to relieve the strand of a considerable amount of the inertial force imparted to the strand during the high velocity pulling of the strand by the belt attenuator. Located immediately below the deflector screen is a container, generally indicated at 16, which is positioned on a rotating table 19 driven by a motor (not shown). The rotating table 19 rests on a platform 18 which is supported by wheels 17 so that the unit can be moved from under the attenuator easily. The rotating container 16 allows strand 20 to accumulate therein and is provided on its side surfaces with a plurality of perforations 21 to permit circulation of ambient air therethrough for further drying of the strand and to permit circulation of hot gases during a positive hot air heating step to which the strand is normally subjected.

Turning now to the drawing and the equipment shown therein, in general the fiber glass bushing 1 is constructed of a noble metal, preferably platinum or a platinum — rhodium alloy. The platinum alloy is typically 80 percent platinum and 20 percent rhodium and the bushing is fabricated such that the bottom portion of the bushing is provided with bushing tips. An exemplary fiber glass bushing is shown in U.S. Pat. No. 3,164,457.

The binder applicator 3 may take any convenient form and while it is shown in the drawing as a roller, it can be conveniently a spraying device or other similar mechanical construction designed to provide liquid material to the surface of the glass fibers as they are drawn from the bushing. Drawing speeds are generally between 500 and 10,000 feet per minute and preferably between 800 to 3,000 feet per minute. The oven generally indicated at 4 can be any convenient drying source and thus recourse to gas fired ovens, electric ovens and similar equipment specifically designed for the removal of moisture from material passing through it can be had. The gathering shoe 5 is generally constructed to gather the fibers removed from the oven into one or more strands to which the water is added in spray device 6. These gathering shoes are generally grooved wheels containing one or more grooves depending upon the number of strands being formed.

Their grooved surface is typically graphite though other material such as metals may be used. The spraying device 6 is operated in a manner such that the quantity of water touching the strand is regulated to provide between 2 and 6 weight percent on the gathered strand, preferably 3 to 5 weight percent.

The belt attenuator shown in the drawing should be capable of trapping the strand passing between the belts and projecting them from the lower wheels 13 and 14 at speeds between 500 and 10,000 feet per minute and preferably operate to provide strand speeds of 800 to 3,000 feet per minute. The momentum relieving device 15 can take any convenient form, but in general it is preferred that it be a fine wire mesh screen since this material tends to reduce the inertial forces sufficiently and yet does not cause accumulation on the surface of strands as they are bounced off this surface. The utilization of solid materials is also contemplated for this purpose. The continer 16 may take any convenient shape or size, but is preferably a cylindrical container with suitable apertures on the sides thereof to provide for adequate circulation of drying air in the subsequent drying operations conducted after the strand has been accumulated therein. It is preferred in the operation of the instant invention to provide a rotatable surface underneath the container so that the container can be slowly revolved to catch the loops of strand as they bounce off the deflector screen 15 in circular fashion. The speed of rotation of the table should be variable so that different degrees of rotation may be imparted to the table depending upon the particular weight of the strand that is being collected. Rotations of 2 to 20 revolutions per minute are contemplated; 4 to 16 revolutions per minute are preferred.

While strands of glass fibers have been packaged in containers before, the primary difficulty has been in effectively removing the strand at acceptable rates for customer use once the strands have dried. In accordance with the instant invention, it has been found that after the initial drying step the addition of controlled amounts of moisture to the gathered strand prior to its introduction into the container and followed by drying results in minimized sloughs in the strand as it is removed from the container at speeds normally encountered by users of the finished product. Thus, by placing on the gathered strand quantities of water ranging from 2 to 6 percent as the strand is passed to the attenuator, acceptable runout of the strand from the container is achieved. When the fibers having binder applied thereto are simply dried, gathered into strand form and passed to the containers without the post addition of moisture, poor runout of the strand from the containers is experienced.

The following examples illustrate the practice of the present invention as applied to strands used to reinforce both rubber and plastics.

EXAMPLE I

Utilizing a laboratory glass fiber forming marble melt bushing having 1,000 tips and a 10 pound per hour glass throughout, a K–15 strand was prepared and containerized using the equipment depicted in the drawing. The binder employed to apply size and resin to the glass fiber to render them compatible for plastic reinforcement contained the ingredients listed in Table 1:

Table 1

| Ingredients | Amount (Grams) |
| --- | --- |
| Epon 828 (A liquid epoxy resin manufactured by Shell Chemical Company) | 4,572 |
| 847A (A carbowax maleinized epoxy resin manufactured by PPG Industries, Inc.) | 1,219.2 |
| Industrol F. C.-108 (nonionic surfactant of ethylene oxide additive to polypropylene glycol manufacture by Whitestone Chemical Company) | 584.2 |
| Emulphor EL-719 (polyoxyethylated vegetable oil manufactured by G.A.F. Corporation) | 584.2 |
| Igepal CA-630 (Acetyl phenoxy polyoxyethane ethanol) | 330.2 |
| A-174 (Gamma-methacryloxypropyltrimethoxysilane) | 1,168.4 |
| Acetic Acid (Glacial acetic) | 65 milliliters |
| PVP K-30 (Polyvinylpyrrolidone manufactured by G.A.F. Corporation) | 1,168.4 |
| Emery 4046-D (Amidated polyamine manufactured by Emery Industries, Inc.) | 152.4 |
| Water | 38,640 |

The binder solution having a solids content of 4.5 ± 0.15 and a pH of 5.5 ± 0.5 was added to the reservoir (not shown) of the applicator 3 which was a roller-type applicator. Glass fibers 2 emerging from the bushing 1 were drawn across the applicator 3 and pick up binder in the range of between 0.33 to 0.88 percent by weight of the glass. The glass fibers 2 containing binder were then passed through a six foot length of a gas fired oven 4 operating at a temperature of 900°F. The fibers 2 were being drawn from the bushing 1 at the rate of about 800 feet per minute. The fibers 2 leaving the oven were substantially dry, i.e., their moisture content basis glass weight was 1 percent or less and were gathered into strand 20 by the gathering shoe 5 and passed under water spray 7 issuing from the nozzle 6. The strand 20 passed between belts 9 and 12 of the attenuator as a result of the water spray and had a water content of 2 to 6 percent by weight basis the weight of the glass. The strand 20 was bounced off of the deflector screen 15 which was a wire mesh screen and was collected in container 16. The container 16 was varied in size during several runs to accumulate various amounts of glass strand. The diameter of the container employed is listed in Table 2 as is the weight of glass collected in each. During the collection of the strand 20 in container 16 the container was rotated at 8 to 16 revolutions per minute. The containers were made of steel sheet metal perforated to provide 35 percent voids on the side wall surfaces.

After packaging the strand in the containers, the containers were placed in hot air ovens and dried at 270°F. for 16 hours. The strands were completely dry, i.e., they had a moisture content basis glass weight below 0.05 percent.

The strand prepared in this manner was run out of the containers and the number of sloughs was recorded at a payout speed of 250 feet per minute. The results of these runs are shown in Table 2:

Table 2

| Package | Container Dia. (inches) | Glass Weight (pounds) | LOI (Percent) | *Sloughs At 250 F.P.M. Runout |
|---|---|---|---|---|
| 1 | 15 | 20 | .76 | 0 |
| 2 | 15 | 40 | .40 | 0 |
| 3 | 15 | 51 | .52 | 0 |
| 4 | 15 | 33½ | .52 | 1 |
| 5 | 15 | 32¼ | .60 | 0 |
| 6 | 15 | 27½ | .61 | 0 |
| 7 | 15 | 32 | .56 | 0 |
| 8 | 18 | 42¼ | .56 | 0 |
| 9 | 18 | 41¾ | .88 | 0 |
| 10 | 15 | 34¼ | .43 | 0 |
| 11 | 15 | 24¼ | .47 | 0 |
| 12 | 15 | 35 | .38 | 0 |
| 13 | 15 | 30 | .60 | 0 |
| 14 | 18 | 48 | .45 | 0 |
| 15 | 18 | 37 | .60 | 0 |
| 16 | 15 | 46¾ | .51 | 0 |
| 17 | 15 | 30 | .43 | 0 |
| 18 | 15 | 34¼ | .48 | 0 |
| 19 | 15 | 33¾ | .52 | 0 |
| 20 | 18 | 41¼ | .52 | 0 |
| 21 | 30 | 138½ | .60 | 1 |
| 22 | 15 | 36 | .74 | 0 |
| 23 | 15 | 35¼ | .48 | 0 |
| 24 | 15 | 34¼ | .68 | 1 |
| 25 | 15 | 33 | .44 | 0 |
| 26 | 18 | 61 | .36 | 0 |
| 27 | 18 | 64½ | .33 | 0 |

*Slough - A condition that occurs when the single strand being run out catches additional strands in a clump, knot or loop which interferes with the running of the strand.

As can be seen from the above table only three sloughs occurred during the payout of over 1,100 pounds of glass. The strand used contains 1,500 yards of strand per pound of glass and thus the runout efficiency of this experiment overall was one slough for each 558,600 yards of strand.

EXAMPLE II

In another group of experiments, a K-15 strand suitable for use as reinforcement for rubber was packaged in containers in accordance with the invention and using the equipment depicted in the drawing.

In this series of runs the 10 pound per hour bushing used in Example I was employed. A size solution compatible with glass fibers and suitable for use in reinforcing rubber was prepared having the composition of Table 3.

Table 3

A size formulation is prepared having the following constituents:

| Ingredients | Weight in grams |
|---|---|
| Amylon Starch - (fractionated natural potato starch with 55 percent by weight amylose) | 761 |
| National HFS Starch - (corn starch crosslinked with phosphorous oxychloride and having 27 percent by weight amylose.) | 761 |
| Pureco Oil (hydrogenated cottonseed oil) | 340 |

-Continued

| Ingredients | Weight in grams |
|---|---|
| Tween 81 (ethylene oxide derivative of a sorbitol ester. | 81 |
| Cation X (alkyl imidazoline reaction product of tetraethylene pentamine and stearic acid) | 152 |
| Carbowax 300 (polyethylene glycol having a molecular weight of about 300). | 180 |
| Biomet 66 (aqueous dispersion of bis(tri-n-butyl-tin)oxide) | 0.37 |
| Igepal CA 630 (acetyl phenoxy polyoxyethane ethanol) | 332 |
| Mobilcer Q (50% aqueous dispersion of microcrystalline wax) | 800 |
| C-600 (modified diamine saline) | 200 |
| Glacial acetic acid | 50 |
| Water (sufficient to provide final volume of size of | 37,854.34 cc |

The glass sizing composition was used to supply size to the applicator 4 which in turn supplied size to the glass fibers 2 as they were drawn from bushing 1. The sized fibers 2 were passed through the oven 4 which was operated at about 1,000°F. The fibers 2 leaving oven 4 were substantially dry, i.e., 1 percent by weight or less, and were gathered into a strand by gathering shoe 5. As the strand passed under nozzle 6, a water spray 7 was used to place about 5 percent water on the strand prior to its passage through the belts 9 and 12 of the attenuator. The strand was then projected off the deflector 15 and into container 16 rotating at 8 to 16 revolutions per minute. Container 16 was then dried at 250°F. in a hot air oven for 16 hours. The dried strand was then run out of the container 16 at 350 feet per minute. Two hundred and seventy-six pounds of strand were run out at these speeds without any slough occurring.

While certain types of equipment have been shown as useful in practicing the invention, many modifications may be made without departing from the spirit of the invention. Thus, recourse to electric ovens in lieu of the gas fired oven 4 may be had. Similarly, while a geared tooth belt attenuator has been shown in the drawing, the use of other belt attenuators or wheel pullers and other similar devices is also contemplated.

Thus, while the invention has been described with reference to certain specific embodiments and illustrations, it is not intended to be limited thereby except insofar as appears in the accompanying claims.

I claim:

1. A method of collecting fibrous glass strand comprising drawing a plurality of glass fibers from a molten glass source; applying size to said fibers as they are being drawn; drying the fibers to remove substantially all of the moisture therefrom; rewetting the fibers to supply 2 to 6 percent by weight water therein; passing the moisture laden fibers in strand form into a container in random layers and drying the strand in said container to remove a substantial portion of the moisture applied to the strand during the moisture treatment step.

2. A method of processing glass fibers comprising drawing glass fibers from a molten glass source at speeds of 500 to 10,000 feet per minute, applying binder and moisture to the fibers as they are being drawn, removing the moisture therefrom to provide substantially dry fibers, gathering the dry fibers into strand, applying water to said strand to provide a strand containing 2 to 6 percent by weight water basis the glass fibers, passing the strand so formed into a container in random layers and subsequently drying the strand in said container to a moisture content of 0.05 percent by weight or less.

3. A method of processing a fibrous glass strand comprising drawing a plurality of glass fibers from a molten glass source, applying a binder to said glass fibers as they are drawn from an aqueous media, drying said fibers to provide a moisture content of less than 0.5 percent by weight therein, gathering the fibers so dried into strand form, applying to the formed strand a moisture content of 2 to 6 percent by weight, passing the strand into a moving container in random layers and drying the strand so collected for a time and at temperature sufficient to provide a moisture content therein of less than 0.05 percent by weight.

4. The method of claim 3 wherein the fibers are drawn at speeds of 500 to 10,000 feet per minute.

5. The method of claim 4 wherein the fibers are dried at temperature of 270°F. or higher.

6. The method of claim 1 wherein the collected strand is dried to a water content of 0.05 percent by weight or less.

* * * * *